UNITED STATES PATENT OFFICE.

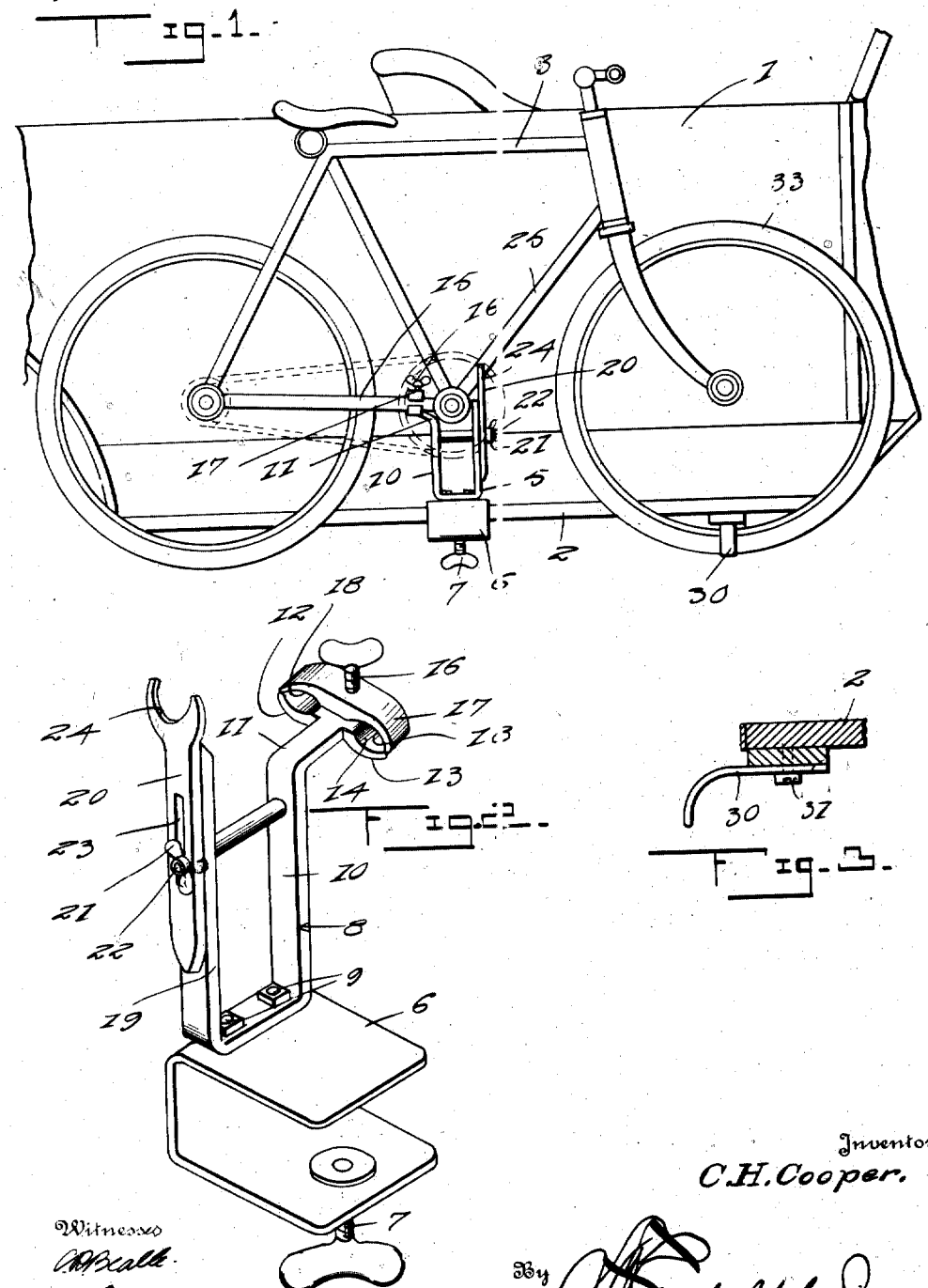

CHARLES H. COOPER, OF BUENA VISTA, FLORIDA.

BICYCLE-CARRIER.

1,223,258.  Specification of Letters Patent.  Patented Apr. 17, 1917.

Application filed May 9, 1916. Serial No. 96,540.

*To all whom it may concern:*

Be it known that I, CHARLES H. COOPER, a citizen of the United States, residing at Buena Vista, in the county of Dade and State of Florida, have invented certain new and useful Improvements in Bicycle-Carriers; and I do hereby declare the following to be a full, clear, and exact description of the invention, such as will enable others skilled in the art to which it appertains to make and use the same.

This invention relates to a bicycle carrying attachment for automobiles, and the primary object of the invention is to provide a bracket which is extremely simple in construction, and which may be quickly and easily clamped to the running board of an automobile for supporting a bicycle alongside of the automobile so that the bicycle may be transported by the automobile.

With the foregoing and other objects in view this invention consists in such novel features of construction, combination and arrangement of parts as will be hereinafter more fully described, illustrated in the accompanying drawing and claimed.

In describing the invention in detail reference will be had to the accompanying drawing wherein like characters designate like and corresponding parts throughout the several views, and in which:—

Figure 1 is a side elevation of the improved carrier showing the same applied.

Fig. 2 is a perspective view of the carrier, and

Fig. 3 is a detail view of a device used for engaging the front wheel of the bicycle.

Referring more particularly to the drawing, 1 designates an automobile of any ordinary construction, having a running board 2, and 3 designates an ordinary bicycle. The carrier structure which is generically indicated by the numeral 5 comprises a clamp 6 which is composed of a substantially U-shaped piece of metal and has a thumb screw 7 carried thereby which is adapted for clamping engagement with the under surface of the running board 2 of the automobile for securely attaching the carrier to the automobile. The carrier structure 5 also comprises a substantially U-shaped bar 8 which is attached by means of bolts 9 to the upper surface of the U-shaped clamp 6. The upper end of the leg 10 of the U-shaped member 8 is bent outwardly, as shown at 11 and it has wings 12 and 13 formed thereon which have their upper surfaces concavely cut as shown at 14 for snugly fitting the curved part 15 of the bicycle 3. A thumb screw 16 is carried by the angled port on 11 of the leg 10 and it has a clamping block 17 carried thereby, the under surface of which is provided with concaved portions 18 for fitting upon the upper surface of the forked brace 15, for securely clamping the brace of the bicycle. The leg 19 of the U-shaped member 8 has a forked bar 20 adjustably connected thereto by means of a wing nut 21 which is mounted upon a bolt 22, and a slot 23 formed in the forked bar 20, through which the bolt 22 extends. The bolt 22 extends through the leg 19 and is attached to the leg 10. The upper forked end 24 of the bar 20 engages the angled brace 25 of the bicycle structure 3 as clearly shown in Fig. 1 of the drawing and coacts with the clamping structure for securely holding the bicycle attached to the automobile. When it is desired to attach the bicycle to the side of the automobile or machine opposite to the side as illustrated in Fig. 1, the U-shaped clamp structure 8 is disconnected from the clamp 6 and is positioned reversely with respect thereto.

A bar 30 is pivotally connected as shown at 31 to the under surface of the running board 2 and it is provided for engaging the front wheel 33 of the bicycle 3 for steadying this wheel.

In reducing the invention to practice, certain minor features of construction, combination and arrangement of parts may necessitate alteration to which the patentee is entitled provided such alterations are comprehended within the scope of what is claimed.

What is claimed is:—

1. In a bicycle carrier, the combination, of an attaching clamp, a substantially U-shaped bar detachably connected to said attaching clamp, said bar having the upper end of one of its legs bent outwardly, transversely positioned wings formed upon said outwardly bent end and having their upper surfaces concavely cut, a thumb screw adjustably carried by the outer bent end of said leg, and a clamping plate carried by said thumb screw and adapted for coaction with said wings for securely clamping the U-shaped member to a portion of a bicycle frame, the other leg of said member having its upper end forked.

2. In a bicycle carrier, the combination, of an attaching clamp, a substantially U-shaped bar detachably connected to said attaching clamp, said bar having the upper end of one of its legs bent outwardly, transversely positioned wings formed upon said outwardly bent end and having their upper surfaces concavely cut, a thumb screw adjustably carried by the outer bent end of said leg, a clamping plate carried by said thumb screw and adapted for coaction with said wings for securely clamping the U-shaped member to a portion of a bicycle frame, and a forked bar adjustably carried by the other leg of said U-shaped member.

In testimony whereof I affix my signature in presence of two witnesses.

CHARLES H. COOPER.

Witnesses:
CHAS. MONTGOMERY,
M. B. POLLARD.